(12) United States Patent
Yun et al.

(10) Patent No.: US 11,584,015 B2
(45) Date of Patent: Feb. 21, 2023

(54) GRIPPER SYSTEM

(71) Applicant: DAEGU GYEONGBUK INSTITUTE OF SCIENCE AND TECHNOLOGY, Daegu (KR)

(72) Inventors: Dong Won Yun, Daejeon (KR); Dong Hyun Kim, Busan (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 173 days.

(21) Appl. No.: 16/919,585

(22) Filed: Jul. 2, 2020

(65) Prior Publication Data
US 2021/0094185 A1 Apr. 1, 2021

(30) Foreign Application Priority Data
May 3, 2019 (KR) ................... 10-2019-0052369

(51) Int. Cl.
*B25J 9/16* (2006.01)
*B25J 9/00* (2006.01)
*B25J 13/08* (2006.01)
*B25J 15/00* (2006.01)

(52) U.S. Cl.
CPC .......... *B25J 9/1694* (2013.01); *B25J 9/0087* (2013.01); *B25J 9/1612* (2013.01); *B25J 13/085* (2013.01); *B25J 15/0023* (2013.01)

(58) Field of Classification Search
CPC ...... B25J 9/1694; B25J 9/0087; B25J 9/1612; B25J 13/085; B25J 15/0023; B25J 15/0028; B25J 19/02
See application file for complete search history.

(56) References Cited

U.S. PATENT DOCUMENTS

| | | | | |
|---|---|---|---|---|
| 5,250,074 A | * | 10/1993 | Wilk | A61B 17/12 606/158 |
| 2011/0276082 A1 | * | 11/2011 | Fehring | A61H 1/0285 606/204 |
| 2013/0033050 A1 | * | 2/2013 | Matsuoka | B66C 1/42 294/86.4 |
| 2016/0279803 A1 | * | 9/2016 | Lessing | B32B 38/10 |
| 2016/0361821 A1 | * | 12/2016 | Lessing | B25J 15/0061 |

(Continued)

FOREIGN PATENT DOCUMENTS

JP H08294885 A 11/1996
JP 3764207 B2 4/2006
(Continued)

OTHER PUBLICATIONS

Korean Office Action dated Aug. 3, 2020 issued in corresponding Korean Appln. No. 10-2019-0052369.

*Primary Examiner* — Stephen A Vu
(74) *Attorney, Agent, or Firm* — Harness, Dickey & Pierce, P.L.C.

(57) ABSTRACT

A device for gripping an object includes a pair of grippers each having a gripping surface formed with a plurality of fine channels, a driver for driving the pair of grippers, a pump connected to at least one of the plurality of fine channels, to supply a fluid to the at least one of the plurality of fine channels, and a controller for controlling the driver to enable the pair of grippers to grip the object or controlling the pump to adjust an amount of the fluid supplied to the gripping surface.

17 Claims, 10 Drawing Sheets

(56) References Cited

U.S. PATENT DOCUMENTS

| | | | | |
|---|---|---|---|---|
| 2018/0257241 A1* | 9/2018 | Claretti | ................ | B25J 15/0028 |
| 2019/0047156 A1* | 2/2019 | Curhan | ................... | B25J 15/12 |
| 2019/0299424 A1* | 10/2019 | Curhan | ................ | B25J 15/0023 |
| 2020/0055197 A1* | 2/2020 | Chavan Dafle | ...... | B25J 15/0023 |
| 2020/0156261 A1* | 5/2020 | Lin | ...................... | B25J 15/0616 |

FOREIGN PATENT DOCUMENTS

| | | | | |
|---|---|---|---|---|
| JP | 2007-083338 A | | 4/2007 | |
| JP | 2010-82723 A | | 4/2010 | |
| JP | 2018-058175 A | | 4/2018 | |
| KR | 20130055783 A | | 5/2013 | |
| KR | 101334334 B1 | | 11/2013 | |
| KR | 101401642 B1 | | 5/2014 | |
| WO | WO-2011135450 A1 * | 11/2011 | .......... | B25J 15/0023 |

* cited by examiner

GRIPPER SYSTEM

CROSS-REFERENCE TO RELATED APPLICATION

Pursuant to 35 U.S.C. § 119(a), this application claims the benefit of earlier filing date and right of priority to Korean Patent Application No. 10-2019-0052369, entitled "GRIPPER SYSTEM", filed on May 3, 2019, in the Republic of Korea, the entire disclosure of which is incorporated herein by reference into the present application.

BACKGROUND

1. Technical Field

The present disclosure relates to a gripper system, and more particularly to a gripper system capable of controlling a coefficient of friction at a gripping surface thereof.

2. Description of Related Art

A gripper is a mechanism designed to grip an object or to drop an object to a desired place. In accordance with a driving method thereof, the gripper may be classified into a thermally-driven type, an electrostatically-driven type, a piezoelectrically-driven type, a pneumatically-driven type, and a hybrid type.

The thermally-driven gripper performs gripping using a system in which thermal expansion of a material by joule heat generated in accordance with an applied voltage is utilized and, as such, may have problems associated with high driving voltage and energy consumption, and a problem in that application of the gripper to the field of biology is more or less difficult. The electrostatically-driven gripper uses a system in which object gripping is carried out using electrostatic force between two applied electric charges and, as such, has drawbacks in that driving displacement and gripping force according to a voltage are small. The piezoelectrically-driven gripper has advantages of precise driving control and high gripping force, but has a problem in that an intrinsic hysteresis phenomenon exhibited in a piezoelectric material should be minimized.

Meanwhile, the pneumatically-driven gripper utilizes pneumatic pressure and, as such, has advantages in that the pneumatically-driven gripper does not need particular energy such as a voltage, and is applicable to various application fields. However, in the pneumatically-driven gripper, gripping operation is controlled only through displacement control or force control and, as such, there is a problem in that it is difficult to grip objects of various shapes and various materials.

PRIOR ART LITERATURE

Patent Documents

Patent Document 0001: Korean Unexamined Patent Publication No. 10-2013-0055783 A (May 29, 2013)

SUMMARY OF THE INVENTION

An aspect of the present disclosure is to provide a device for gripping capable of controlling a coefficient of friction at a gripping surface through discharge of a fluid to the gripping surface.

However, such an aspect is illustrative, without limiting the scope of the present disclosure.

In accordance with an embodiment of the present disclosure, there is provided a device for gripping an object, including a pair of grippers each having a gripping surface formed with a plurality of fine channels, a driver for driving the pair of grippers, a pump connected to at least one of the plurality of fine channels, to supply a fluid to the at least one of the plurality of fine channels, and a controller for controlling the driver to enable the pair of grippers to grip the object or controlling the pump to adjust an amount of the fluid supplied to the gripping surface.

In accordance with another embodiment of the present disclosure, the device may further include a sensor for measuring a magnitude of force corresponding to a weight of the object. The controller may control the pump on the basis of a measured value from the sensor.

In accordance with still another embodiment of the present disclosure, the controller may receive the measured value from the sensor, and may control the driver to adjust force to grip the object based on deviation of the measured value from a predetermined reference range.

In accordance with yet another embodiment of the present disclosure, the at least one of the plurality of fine channels may have one end connected to the gripping surface and the other end opposite to the one end. The pump may supply the fluid to the at least one of the plurality of fine channels via a connection channel connected to the other ends of the plurality of fine channels.

In accordance with still yet another embodiment of the present disclosure, in the at least one of the plurality of fine channels, a cross-sectional area at one end thereof may be substantially equal to a cross-sectional area at the other end thereof.

In accordance with still yet another embodiment of the present disclosure, in the at least one of the plurality of fine channels, a cross-sectional area at one end thereof may be greater than a cross-sectional area at the other end thereof.

In accordance with still yet another embodiment of the present disclosure, the at least one of the plurality of fine channels may include a first part disposed adjacent to one end thereof, and a second part disposed adjacent to the other end thereof. The first part may have a cross-sectional area gradually increasing as the first part extends from the second part to the gripping surface.

In accordance with still yet another embodiment of the present disclosure, the cross-sectional area of the second part may be substantially uniform in a direction in which the fluid is discharged along the plurality of fine channels.

In accordance with still yet another embodiment of the present disclosure, the plurality of fine channels may be spaced apart from one another by a substantially uniform distance.

The device for gripping according to each of the embodiments of the present disclosure may more safely and precisely grip objects of various materials or various shapes through friction force control using a fluid as well as displacement control for the device for gripping. In addition, the device for gripping according to each of the embodiments of the present disclosure may reduce costs required for precise control and, as such, rapid commercial availability of the grippers may be expected.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
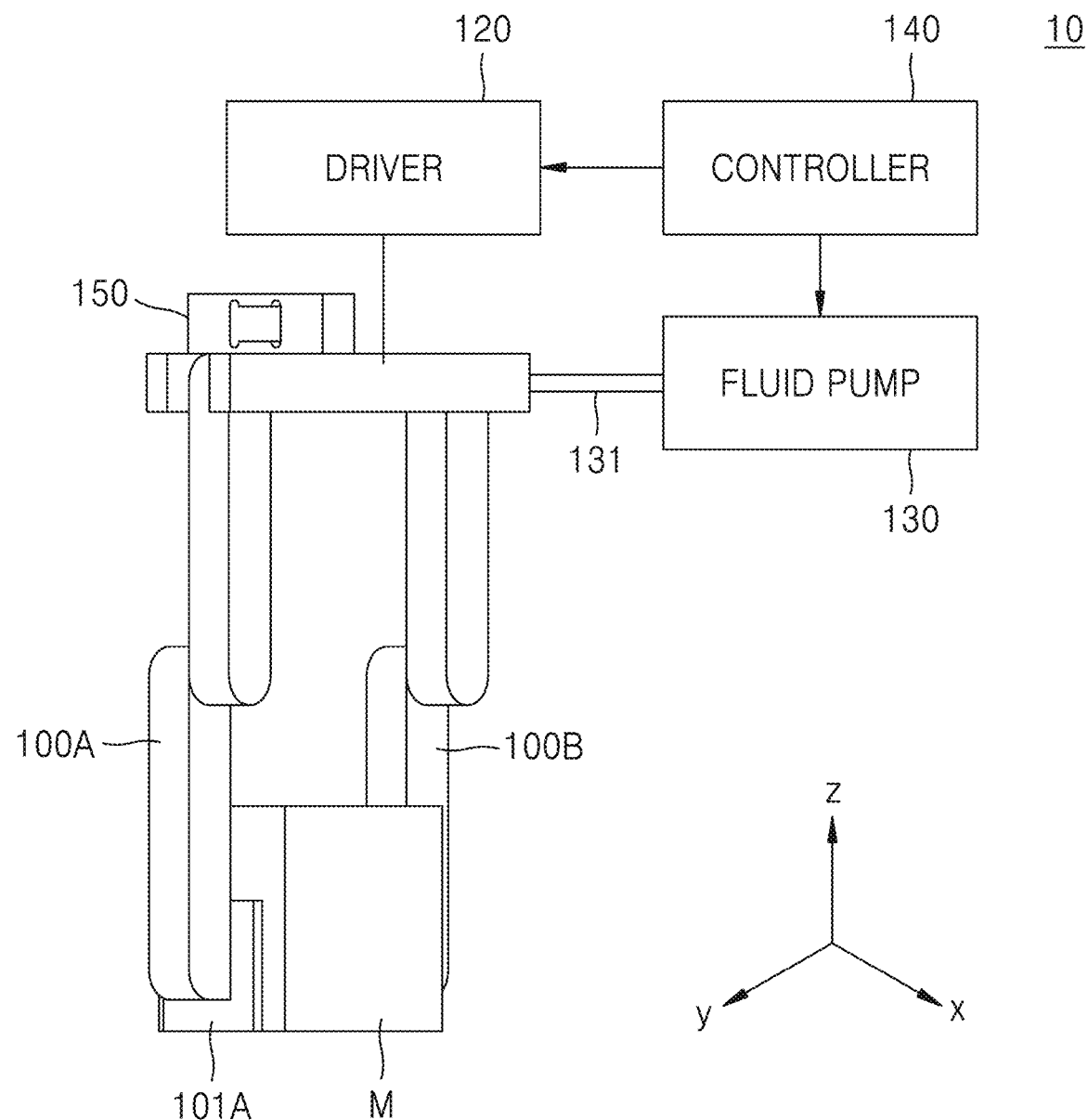
FIG. 1 is a view schematically illustrating a gripper system according to an exemplary embodiment of the present disclosure.

Hereinafter, various embodiments will be described in detail with reference to the accompanying drawings. Embodiments of the present disclosure may be variously varied and may have various forms. In connection with this, specific embodiments will be illustrated in the drawings, and will be described in detail in the specification, but embodiments should not be construed as limited to the specific embodiments. It is to be appreciated that all changes, equivalents, and/or substitutes that do not depart from the spirit and technical scope of the embodiments of the present disclosure are encompassed in the embodiments. In relation to description of the drawings, similar reference numerals are used for similar constituent elements.

The expression "comprise" or "may comprise" usable in various embodiments of the present disclosure is intended to express the existence of a function, an operation, a constituent element, or the like, and does not exclude at least one additional function, operation, constituent element, etc. It should be further understood that the term "comprises", "has", or the like used in various embodiments of the present disclosure specifies the presence of stated features, integers, steps, operations, elements, elements, or combinations thereof, but does not preclude the presence or addition of one or more other features, integers, steps, operations, elements, elements, or combinations thereof.

The term "or" or the like as used herein is to be interpreted as inclusive or meaning any one or any combination. For example, "A or B" may encompass inclusion of A, inclusion of B, or inclusion of both A and B.

Although the terms "first", "second", "primary", "secondary", etc. used in various embodiments of the present disclosure may describe various elements, these elements should not be limited by these terms. For example, the terms do not limit order and/or importance of the elements associated therewith. The terms may be used only for the purpose of distinguishing one element from other elements. For example, both a first user appliance and a second user appliance are user appliances, and represent different user appliances. For example, a first element may be designated as a second element without departing from the scope of the present disclosure. In the same manner, the second element may be designated as the first element.

When an arbitrary element is described as being "connected to" or being "linked to" another element, this should be understood to mean that still other element(s) may exist therebetween, although the arbitrary element may be directly connected to, or linked to, the second element. In contrast, when an arbitrary element is described as being "directly connected to" or being "directly linked to" another element, this should be understood to mean that no element exists therebetween.

The terms used in the present disclosure are used to describe only specific embodiments, and are not intended to limit various embodiments of the present disclosure. A singular expression can include a plural expression as long as it does not have an apparently different meaning in context.

Unless otherwise defined, all terms including technical and scientific terms used herein have the same meaning as commonly understood by one of ordinary skill in the art to which example embodiments belong.

It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Figure 2:
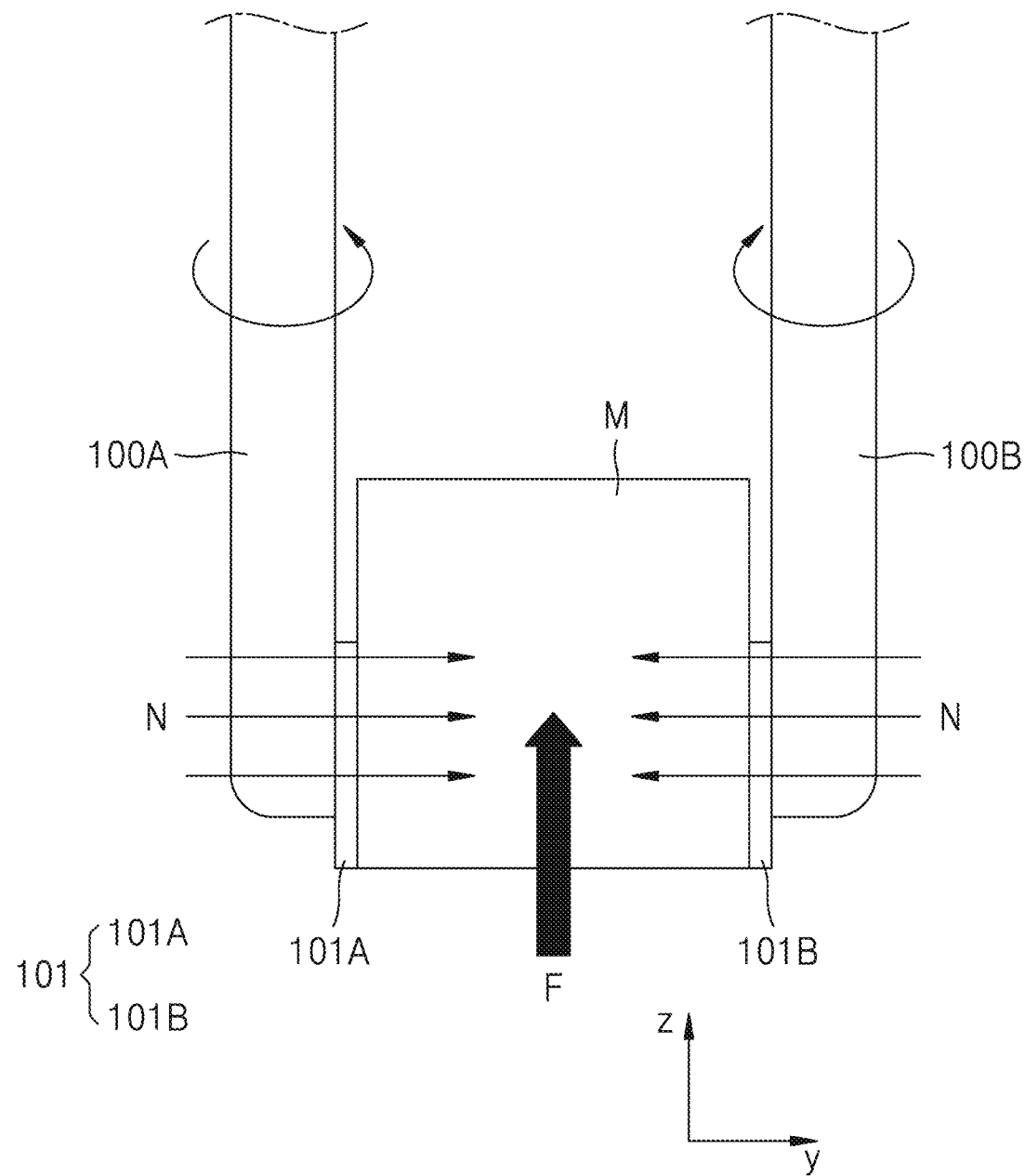
FIG. 2 is a view illustrating a pair of grippers included in the gripper system in order to explain operation of the gripper system.
Figure 3:
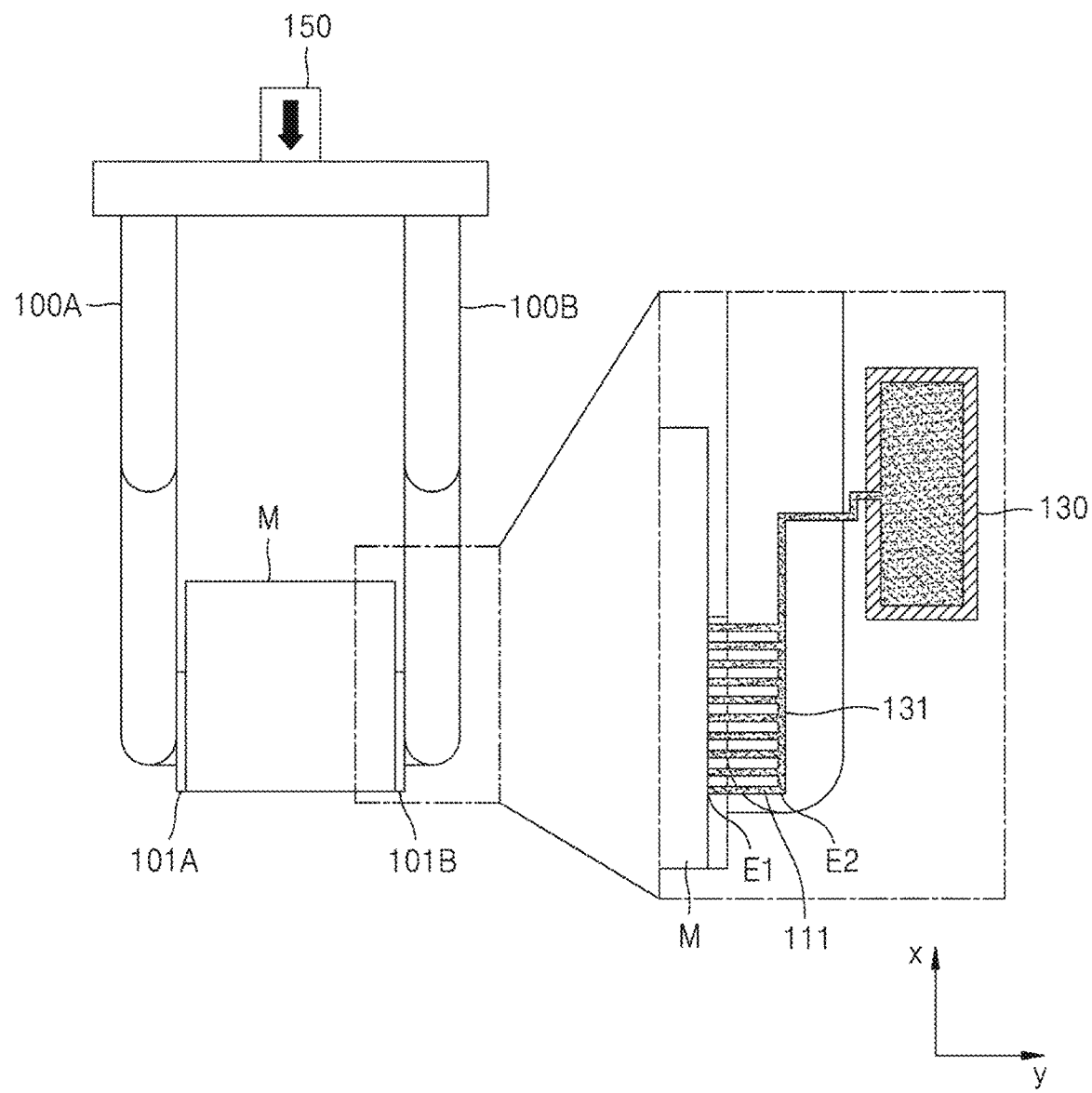
FIG. 3 is a view explaining a plurality of fine channels formed in each gripper.
Figure 4:
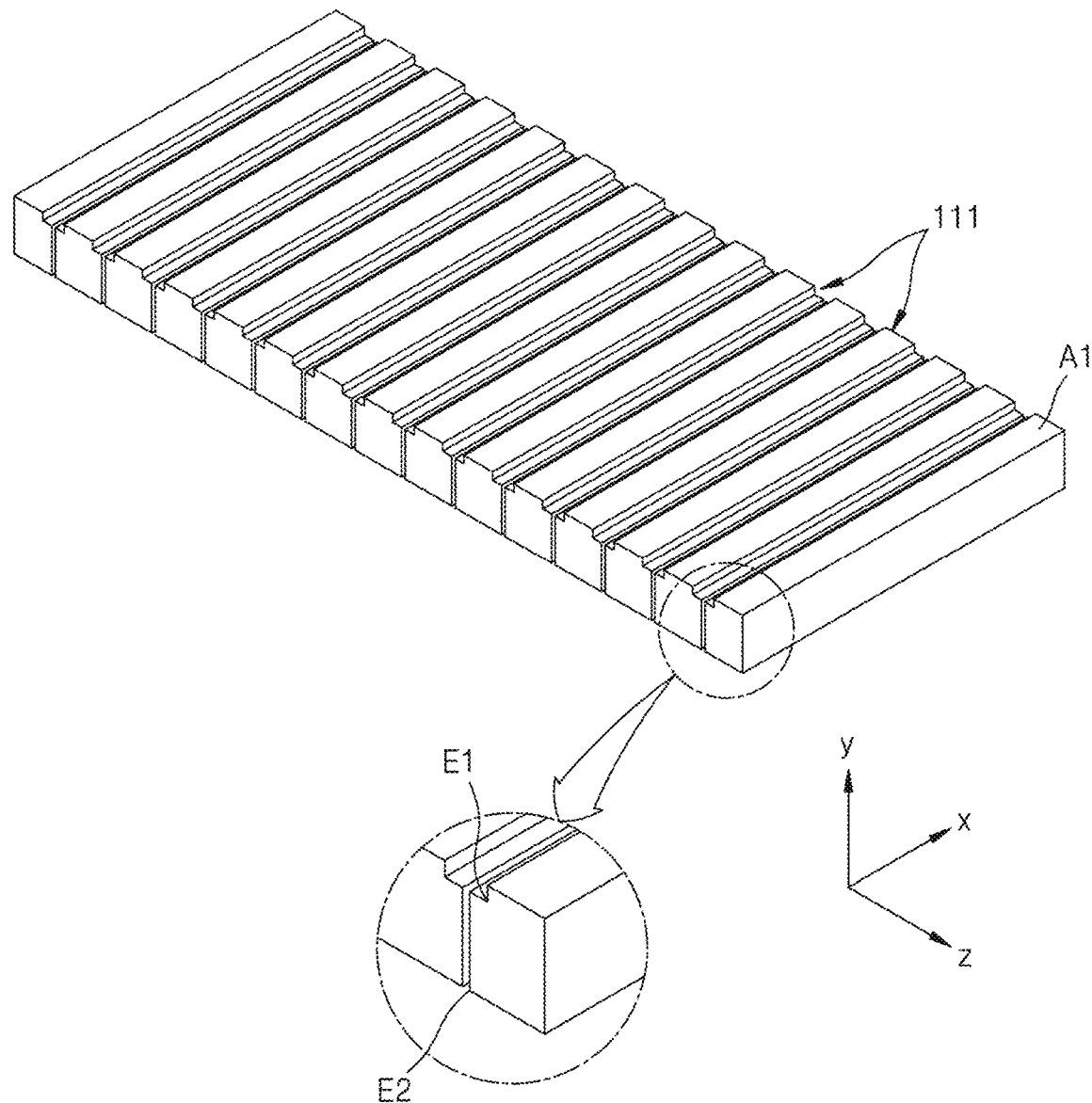
FIG. 4 is a view explaining a disposition form of the plurality of fine channels.
Figure 5:
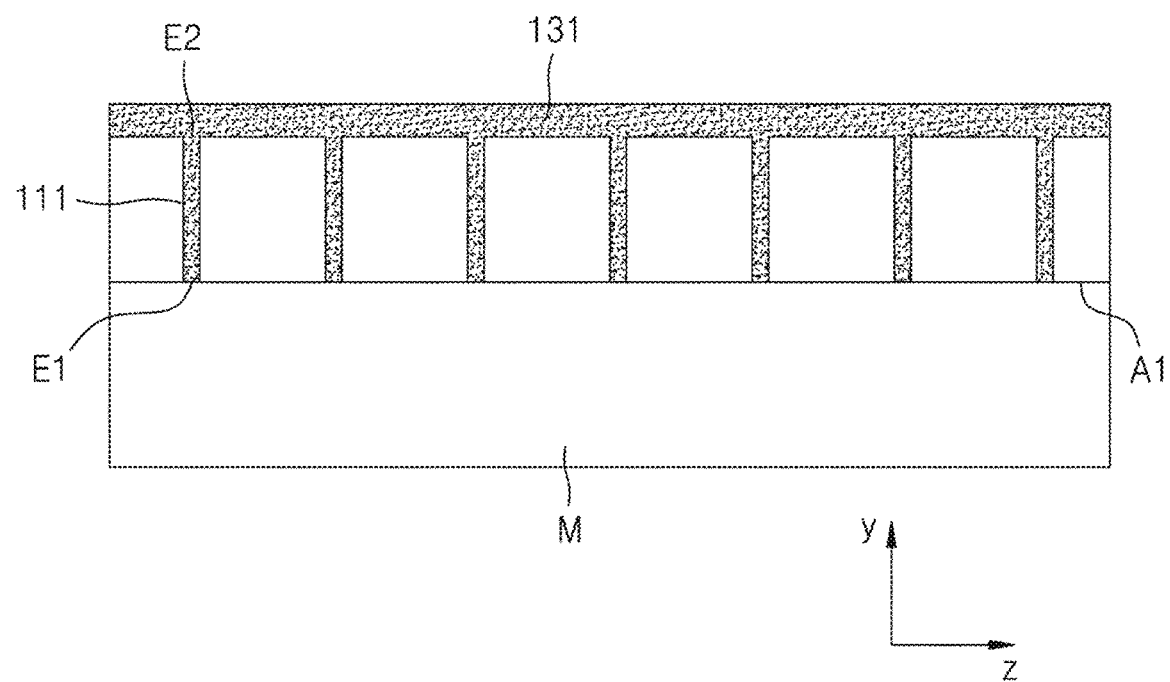
FIGS. 5 to 7 are sectional views illustrating various embodiments of the plurality of fine channels, respectively.
Figure 6:
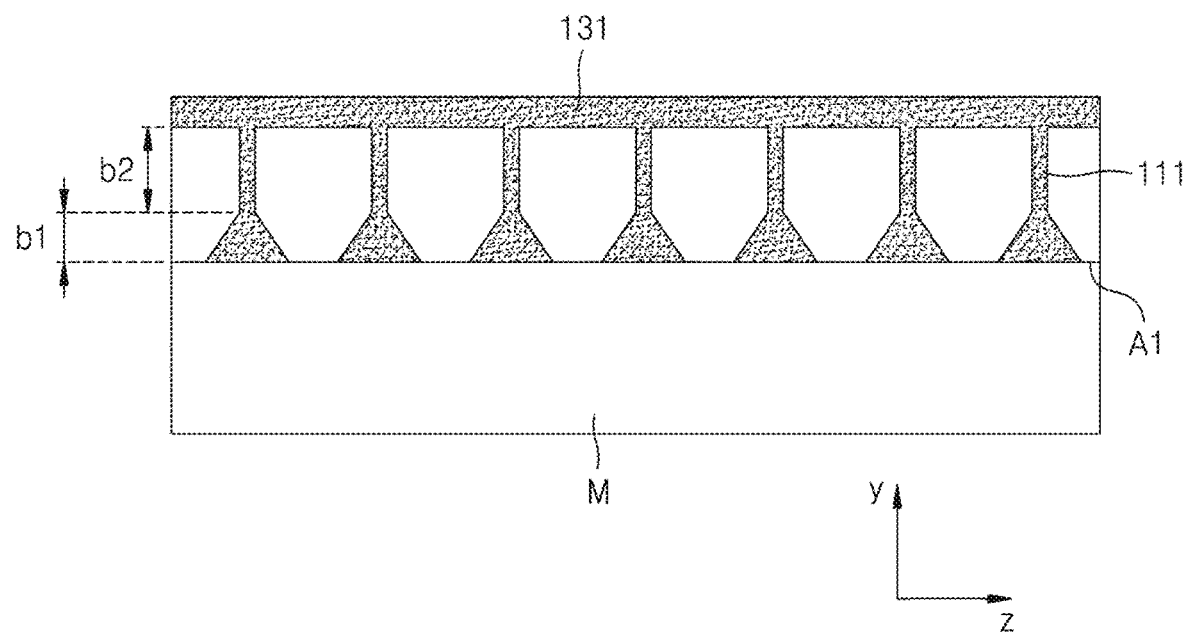
Figure 7:
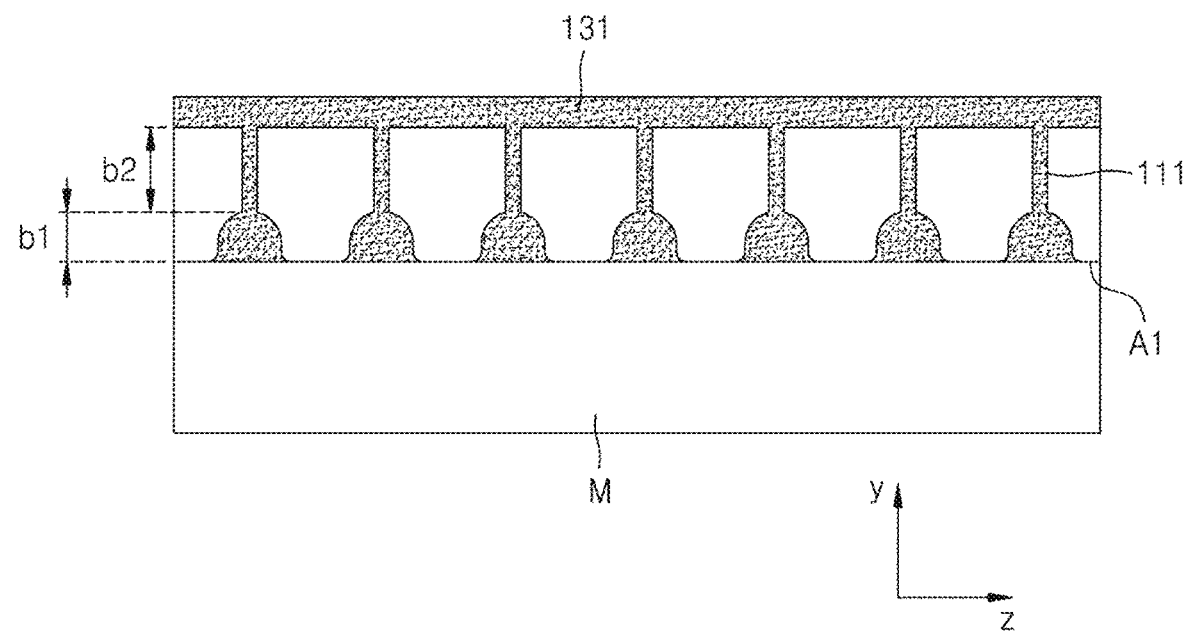

FIG. 1 is a view schematically illustrating a gripper system 10 according to an exemplary embodiment of the present disclosure. FIG. 2 is a view illustrating a pair of grippers 101 included in the gripper system 10 in order to explain operation of the gripper system 10. FIG. 3 is a view explaining a plurality of fine channels 111 formed in each gripper 101. FIG. 4 is a view explaining a disposition form of the plurality of fine channels 111. FIGS. 5 to 7 are sectional views illustrating various embodiments of the plurality of fine channels 111, respectively.

Referring to FIGS. 1 to 7, the gripper system 10 according to the illustrated embodiment of the present disclosure includes the pair of grippers 101, a driver 120, a fluid pump 130, and a controller 140.

The pair of grippers 101 may perform a function of gripping an object M through adjustment of a distance therebetween in a state of being connected to the driver 120. In detail, a first one of the grippers 101, that is, a first gripper 101A, may be connected to a first arm 100A, and a second one of the gripper 101, that is, a second gripper 101B, may be connected to a second arm 100B. The first and second arms 100A and 100B may adjust force to grip the object M while moving under control of the driver 120.

As illustrated in FIG. 2, in order to enable the grippers 101 to lift the object M, force greater than gravity according to the weight of the object M should act in a direction opposite to gravity. In other words, when force F applied to the object M via the pair of grippers 101 is greater than gravity according to the weight of the object M, the object M can be lifted. In this case, the force F applied to the object M may correspond to friction force generated when the pair of grippers 101 contact the object M via gripping surfaces A1. The friction force F may be expressed by a coefficient of friction $\mu$ 1 and normal force N between each gripping surface A1 and the object M ($F=\mu N$).

In conventional griper systems, the material of grippers, in detail, the material of gripping surfaces of the grippers, are fixed and, as such, a coefficient of friction $\mu$ is constant in association with an object M. For this reason, force to grip an object M can be controlled only through adjustment of normal force N. However, when it is desired to grip an object M only through normal force N, as described above, it is difficult to control small normal force N in the case in which the object M is made of a flexible material, as in the case of, for example, a paper cup. As a result, there may be a problem of deformation of the object M, For this reason, it is difficult to grip objects M of various shapes or various materials.

The gripper system 10 according to the illustrated embodiment of the present disclosure is adapted to solve the above-described problems, and has features in that normal force N is controlled through driving of the grippers 101, and the coefficient of friction μ between the gripping surfaces A1 and the object M is controlled through supply of a fluid to the gripping surfaces A1. To this end, each of the grippers 101 according to the illustrated embodiment of the present disclosure may include the gripping surface A1 formed with the plurality of fine channels 111.

Each gripping surface A1 is a surface directly contacting the object M and, as such, may be made of a material such as silicon in order to easily grip the object M. Of course, embodiments of the present disclosure are not limited to the above-described condition. By virtue of the plurality of fine channels 111, each gripping surface A1 may function as a finger print when no fluid is discharged and, as such, may enhance friction force against the object M. In addition, a fluid may be supplied to each gripping surface A1 through the plurality of fine channels 111 fluidically connected to the fluid pump 130.

Each of the fine channels 111 may have one end E1 connected to the corresponding gripping surface A1 and the other end E2 opposite to the one end E1. As illustrated in FIGS. 3 to 7, the plurality of fine channels 111 may be arranged to be spaced apart from one another by a uniform distance. In an embodiment, referring to FIG. 4, the fine channels 111 may be formed in the form of grooves extending in a first direction (x-axis direction) of the corresponding gripping surface A1. The plurality of fine channels 111 may be arranged in parallel to be spaced apart from one another in a second direction (z-axis direction) perpendicular to the first direction (x-axis direction). Here, the second direction (z-axis direction) may be a direction of gravity generated due to the weight of the object M. Accordingly, when the plurality of fine channels 111 is formed along the first direction perpendicular to the direction of gravity, an enhancement in gripping force may be achieved.

The other end of each fine channel 111 may be connected to a connection channel 131. The connection channel 131 provides communication between the plurality of fine channels 111 and the fluid pump 130, thereby transferring a fluid supplied from the fluid pump 130 to the plurality of fine channels 111.

Meanwhile, referring to FIGS. 5 to 7, each fine channel 111 may be formed to have various shapes between one end E1 thereof and the other end E2 thereof. In an embodiment, in each fine channel 111, the cross-sectional area of one end E1 may be equal to the cross-sectional area of the other end E2, as illustrated in FIG. 5. In other words, each fine channel 111 may have a uniform thickness with respect to a fluid flow direction (y-axis direction).

In another embodiment, in each fine channel 111, the cross-sectional area of one end E1 may be greater than the cross-sectional area of the other end E2. Although not shown, each fine channel 111 may be formed such that the cross-sectional area thereof is gradually increased as the fine channel 111 extends from one end E1 thereof to the other end E2 thereof. Alternatively, each fine channel 111 may be formed to have different shapes in areas thereof divided with respect to the fluid flow direction (y-axis direction). In other words, as illustrated in FIG. 6 or 7, each fine channel 111 may include a first area (a first part) b1 disposed adjacent to one end E1, and a second area (a second part) b2 disposed adjacent to the other end E2.

The second area b2 of each fine channel 111 is an area to receive a fluid through the connection channel 131, whereas the first area b1 of each fine channel 111 is an area disposed adjacent to the corresponding gripping surface A1 contacting the object M. In this case, the cross-sectional area of the first area b1 may be gradually increased as the first area b1 extends from the second area b2 to the corresponding gripping surface A1. For example, as illustrated in FIG. 6, the first area b1 may be formed to have a shape in which the cross-sectional area of the first area b1 is gradually linearly increased as the first area b1 extends from the second area b2 to the corresponding gripping surface A1, that is, the first area b1 may be formed to have a triangular shape. In another example, as illustrated in FIG. 7, the first area b1 may be formed to have a shape in which the cross-sectional area of the first area b1 is gradually non-linearly increased as the first area b1 extends from the second area b2 to the corresponding gripping surface A1, that is, the first area b1 may be formed to have a bell shape. The plurality of fine channels 111 may easily achieve friction force control using a fluid as, in each fine channel 111, the cross-sectional area thereof at one end E1, that is, the cross-sectional area thereof at the corresponding surface A1, is greater than the cross-sectional area thereof at the other end E2.

Hereinafter, other constituent elements of the gripper system 10 according to the illustrated embodiment of the present disclosure will first be described, and a method for controlling friction force using a fluid will then be described.

Again referring to FIG. 1, the driver 120 may drive the pair of grippers 101. The driver 120 may control gripping force through the pair of grippers 101 by adjusting the distance between the first and second arms 100A and 100B respectively connected to the grippers 101 or adjusting a torque of the first arm 100A or the second arm 100B. In detail, the driver 120 may include a motor or an actuator capable of driving the first and second arms 100A and 100B and, as such, may grip the object M by decreasing the distance between the first and second arms 100A and 100B or may release force to grip the object M by increasing the distance.

The fluid pump 130 may be connected to the plurality of fine channels 111 and, as such, may supply a fluid to the plurality of fine channels 111. Here, the fluid may have a known density ρ. For example, the fluid may be water. Embodiments of the present disclosure are not limited to the above-described condition, and any fluid, the density p of which is previously known, may be applicable. The fluid pump 130 may be supplied to the plurality of fine channels 111 in an amount controlled by the controller 140.

The controller 140 may control the driver 120 and the fluid pump 130. In detail, the controller 140 may control the driver 120 to move the pair of grippers 101 for gripping of the object M or may control the fluid pump 130 to adjust the amount of the fluid supplied to the gripping surfaces A1.

The gripper system 10 according to the illustrated embodiment of the present disclosure may further include a force sensor 150. The force sensor 150 may measure the magnitude of force corresponding to the weight of the object M gripped by the pair of grippers 101. The force sensor 150 may be disposed at the grippers 101 or the arms 100A and 100B connected to the grippers 101 and, as such, may measure the magnitude of force corresponding to the weight of the object M.

Hereinafter, a method for controlling friction force on the grippers 101 through fluid adjustment in the gripper system 10 will be described with reference to the accompanying drawings.

Figure 8:
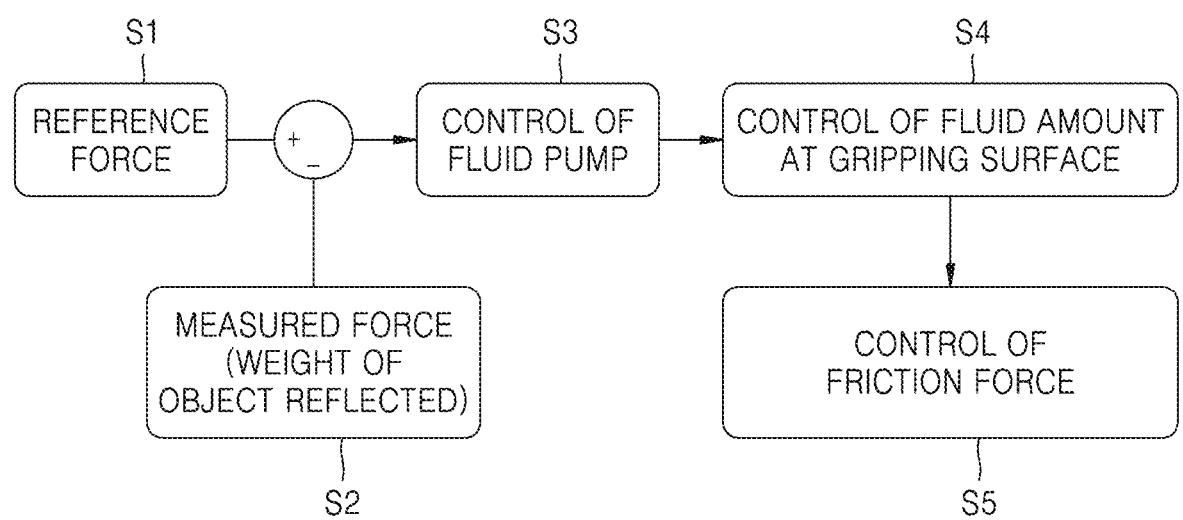
FIG. 8 is a view sequentially illustrating a process for controlling friction force of the grippers in a controller.
Figure 9A:
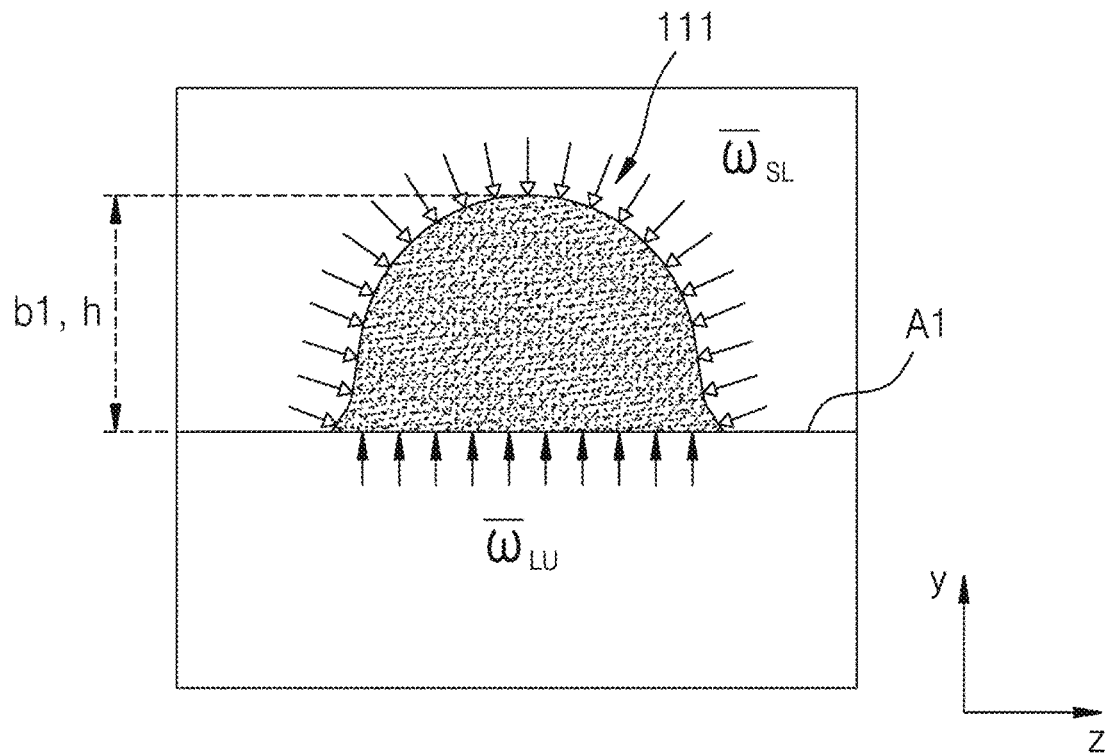
FIGS. 9A and 9B are views explaining a principle for controlling friction force using a fluid.
Figure 9B:
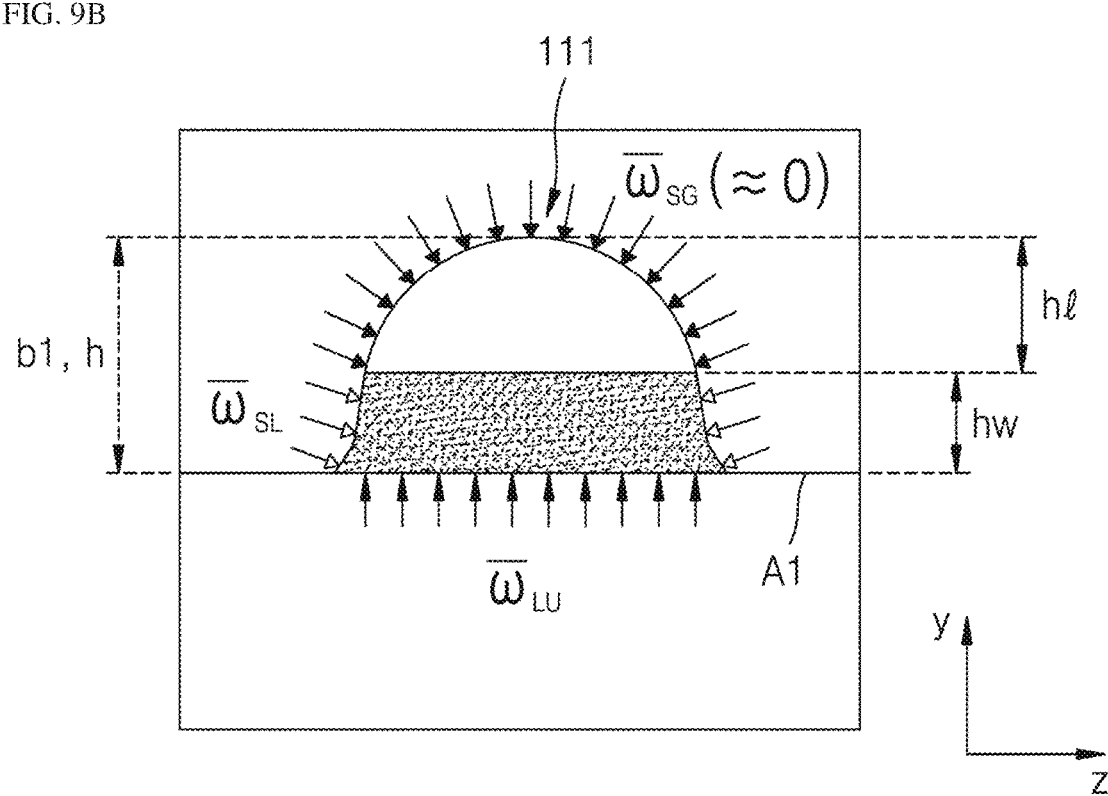
Figure 10:
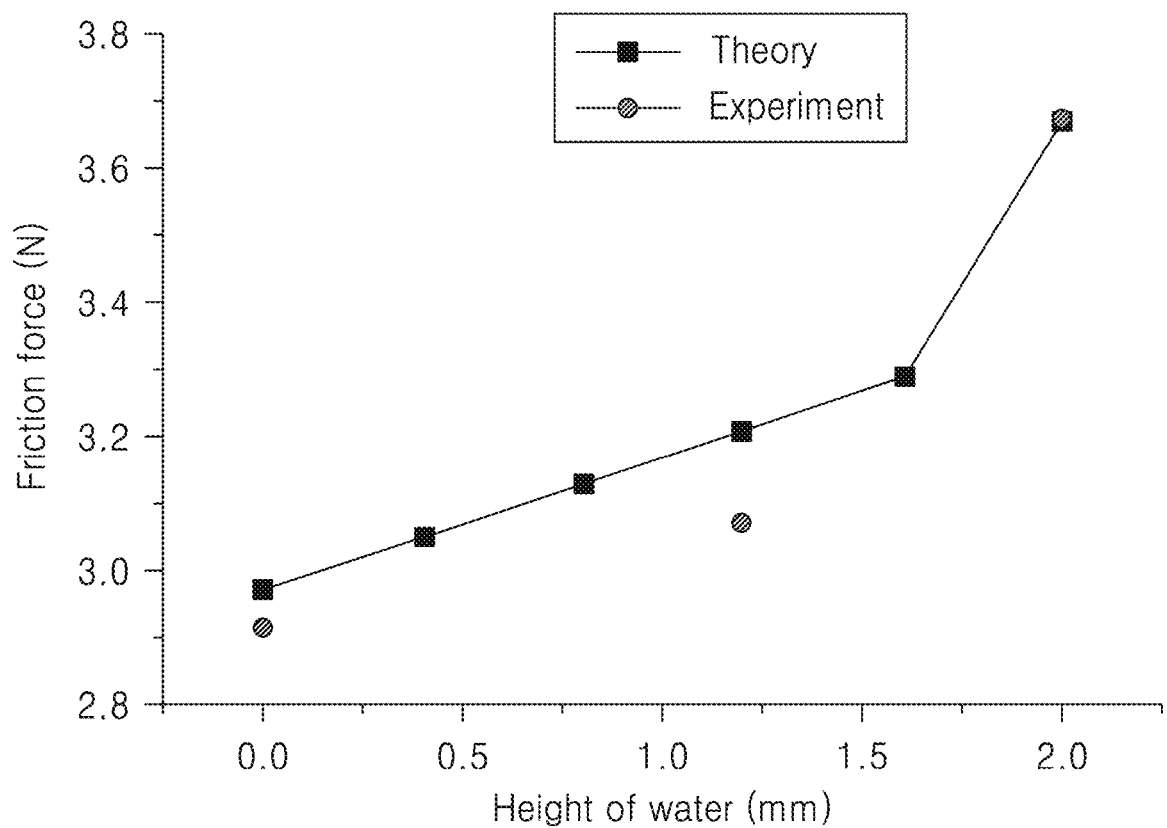
FIG. 10 is a graph depicting comparison between theoretical and experimental values of friction force controlled through fluid adjustment.

FIG. 8 is a view sequentially illustrating a process for controlling friction force of the grippers 101 in the controller 140. FIGS. 9A and 9B are views explaining a principle for controlling friction force using a fluid. FIG. 10 is a graph depicting comparison between theoretical and experimental values of friction force controlled through fluid adjustment.

Referring to FIG. 8, in accordance with an exemplary embodiment of the present disclosure, the controller 140 may set, to reference force, normal force generated through control of movement of the grippers 101 using the driver 120 (51). Thereafter, the controller 140 may receive a measured value from the force sensor 150, that is, a measured value of force having a magnitude corresponding to the weight of an object M (S2). The controller 140 may control the fluid pump 140 on the basis of the measured value received from the force sensor 150 (S3).

In more detail, the controller 140 compares the measured force supplied from the force sensor 150 with the reference force, and may supply a fluid through the fluid pump 140 when there is a difference between the measured force and the reference force. In this case, the controller 140 may previously store information as to the density p of the fluid, the shape of each fine channel 111, etc. The controller 140 calculates additional friction force required due to the difference between the measured force and the reference force and, as such, may derive an amount of the fluid to be supplied for the additional friction force, using the previously stored fluid density p and the shape information of each fine channel 111. Here, the shape information of each fine channel 111 may include the total length of the fine channel 111, the height h of the first area b1 in the fine channel 111, the cross-sectional shape of the first area b1, the cross-sectional area of the fine channel 111 at one end E1, etc.

Referring to FIGS. 9A and 9B, the gripper system 10 according to the illustrated embodiment of the present disclosure has a basic principle for controlling friction force using surface tension by the fluid supplied to each gripping surface A1. Surface tension is generated between a fluid and an object disposed near the fluid in accordance with surface tension of the fluid. As the contact area between the fluid and the object increases, attraction may also be increased and, as such, the fluid may function as a glue. Accordingly, the gripper system 10 may control the contact area by adjusting the amount of the fluid supplied to the plurality of fine channels 111 and, as such, may control friction force on the grippers 101.

In this case, the total surface tension $F_{ad}$ generated at the fine channels 111 may be calculated through the following expressions. In this case, the fluid is, for example, water.

$$F_{ad} = \left(\alpha_{adh}\left(\frac{h_w}{h}\right) + \beta_{adh}\right)\overline{\omega}_{Sl} + \alpha_{adh}\overline{\omega}_{LU}(h \geq h_w \geq h_1) \quad \text{Expression 1}$$

$$F_{ad} = \beta_{adh}\left(\frac{h_w}{h}\right)\overline{\omega}_{SL}(h_1 \geq h_w \geq 0) \quad \text{Expression 2}$$

Expressions 1 and 2 are expressions in the case in which the cross-sectional area in the first area b1 of each fine channel 111 is non-uniform in a fluid flow direction (y-axis direction), as shown in FIGS. 9A and 9B. For example, this case may be the case in which the first area b1 of each fine channel 111 is formed to have a bell shape, as shown in the drawings. Here, "$\overline{\omega}_{LU}$" represents surface tension at a surface contacting the gripping surface A1, and "$\overline{\omega}_{SL}$," represents surface tension at a side surface of the first area b1 of the fine channel 111. In addition, "$\alpha_{adh}$" and "$\beta_{adh}$" represent coefficients for respective surface tensions, and may be values variable in accordance with the shape of the fine channel 111.

For example, when the fluid completely fills the interior of each fine channel 111, as shown in FIG. 9A, the total surface tension $F_{ad}$ may be determined by Expression 1, whereas, when the fluid fills a half or less of the interior of each fine channel 111, as shown in FIG. 9B, the total surface tension $F_{ad}$ may be determined by Expression 2. However, the total surface tension $F_{ad}$ may not be determined only by Expression 1 or 2, and may be varied in accordance with the shape of each fine channel 111. For example, when the cross-sectional area in the first area b1 of each fine channel 111 is uniform in the fluid flow direction (y-axis direction), in other words, when the cross-sectional shape of each fine channel 111 is quadrangular, the total surface tension $F_{ad}$ may be calculated by the following Expression 3:

$$F_{ad} = \frac{A}{h}(\overline{\omega}_{SL} + \overline{\omega}_{LU}) + \frac{nB}{d}\overline{\omega}_{SL} \quad \text{Expression 3}$$

Here, "$\overline{\omega}_{LU}$" represents surface tension at a surface contacting the gripping surface A1, and "$\overline{\omega}_{SL}$" represents surface tension at a side surface of the first area b1 of the fine channel 111. In addition, "h" represents the height of the first area b1 of the fine channel 111, and "d" represents the height of the supplied fluid. In addition, "A" represents the entire width of the fine channel 111, "B" represents the width of the side surface of the fine channel 111, and "n" represents the number of fine channels 111 on the object.

As the controller 40 supplies an adjusted amount of the fluid to the plurality of fine channels 111 having a fixed shape (S4), the controller 40 may control friction force at each gripping surface A1 (S5). As such, the gripper system 10 may achieve fine force control according to weight variation of an object M through friction force control as well as displacement control for the grippers 101. In addition, it may be possible to generate a slip phenomenon (hydroplaning phenomenon) at the gripping surfaces A1 by the fluid by supplying the fluid in a predetermined amount or more. In this case, accordingly, it may be possible to release gripping of the object M without displacement control for the grippers 101.

Meanwhile, the controller 140 receives the measured value from the force sensor 150, and compares the measured value with the reference force, as described above. When a difference between the measured value and the reference force deviates from a reference range, in other words, upon determining that it is impossible to grip the object M through friction force control using the fluid, the controller 140 may control the driver 120 through displacement control for the grippers 101 to adjust force gripping the object M.

FIG. 10 illustrates results of comparison between a theoretical friction force value calculated using the above-described principle and a friction force value obtained through experimental measurement. Referring to FIG. 10, it can be seen that friction force control in the gripper system 10 according to the illustrated embodiment of the present disclosure exhibits conformity with theoretical results within a tolerance range of 10%.

As apparent from the above description, the gripper system according to each of the embodiments of the present disclosure may more safely and precisely grip objects of various materials or various shapes through friction force control using a fluid as well as displacement control for the grippers. In addition, the gripper system according to each of the embodiments of the present disclosure may reduce costs required for precise control and, as such, rapid commercial availability of the grippers may be expected.

While the present disclosure has been explained in relation to its embodiments, it is to be understood that various modifications thereof will become apparent to those skilled in the art upon reading the specification. Therefore, it is to be understood that the present disclosure is intended to cover such modifications as fall within the scope of the appended claims.

What is claimed is:

1. A device for gripping an object, comprising:
   a pair of grippers each having a gripping surface formed with a plurality of fine channels;
   a driver configured to drive the pair of grippers;
   a pump connected to at least one of the plurality of fine channels, configured to supply a liquid to the at least one of the plurality of fine channels; and
   a controller configured to control the driver to enable the pair of grippers to grip the object or controlling the pump to adjust an amount of the liquid supplied to the gripping surface.

2. The device according to claim 1, further comprising:
   a sensor configured to measure a magnitude of force corresponding to a weight of the object,
   wherein the controller is configured to control the pump based on a measured value from the sensor.

3. The device according to claim 2, wherein the controller is configured to
   receive the measured value from the sensor, and
   control the driver to adjust force to grip the object based on deviation of the measured value from a reference range, the reference range being based on a grip force required to hold the object.

4. The device according to claim 1, wherein:
   the at least one of the plurality of fine channels has one a first end connected to the gripping surface and a second end opposite to the first end; and
   the pump is configured to supply the liquid to the at least one of the plurality of fine channels via a connection channel connected to the second end of the at least one of the plurality of fine channels.

5. The device according to claim 4, wherein, in the at least one of the plurality of fine channels, a cross-sectional area at the first end thereof is substantially equal to a cross-sectional area at the second end thereof.

6. The device according to claim 4, wherein, in the at least one of the plurality of fine channels, a cross-sectional area at the first end thereof is greater than a cross-sectional area at the second end thereof.

7. The device according to claim 4, wherein:
   the at least one of the plurality of fine channels comprises a first part disposed adjacent to the first end thereof, and a second part disposed adjacent to the second end thereof; and
   the first part has a cross-sectional area gradually increasing as the first part extends from the second part to the gripping surface.

8. The device according to claim 7, wherein a cross-sectional area of the second part is substantially uniform in a direction in which the liquid is discharged along the plurality of fine channels.

9. The device according to claim 1, wherein the plurality of fine channels are spaced apart from one another by a substantially uniform distance.

10. The device according to claim 1, wherein the plurality of fine channels are configured to control a friction force with the object based on the amount of liquid supplied.

11. A device for gripping an object, comprising:
    a pair of grippers each having a gripping surface formed with a plurality of fine channels;
    a driver configured to drive the pair of grippers;
    a pump connected to at least one of the plurality of fine channels, configured to supply a liquid to the at least one of the plurality of fine channels; and
    a controller configured to control the driver to enable the pair of grippers to grip the object or controlling the pump to adjust an amount of the liquid supplied to the gripping surface,
    a sensor configured to measure a magnitude of force corresponding to a weight of the object,
    wherein the controller is further configured to
    receive the measured value from the sensor,
    control the pump based on a measured value from the sensor, and
    control the driver to adjust force to grip the object based on deviation of the measured value from a reference range, the reference range being based on a grip force required to hold the object.

12. The device according to claim 11, wherein:
    the at least one of the plurality of fine channels has a first end connected to the gripping surface and a second end opposite to the first end; and
    the pump is configured to supply the liquid to the at least one of the plurality of fine channels via a connection channel connected to the second end of the at least one of the plurality of fine channels.

13. The device according to claim 12, wherein, in the at least one of the plurality of fine channels, a cross-sectional area at the first end thereof is substantially equal to a cross-sectional area at the second end thereof.

14. A device for gripping an object, comprising:
    a pair of grippers each having a gripping surface formed with a plurality of fine channels;
    a driver configured to drive the pair of grippers;
    a pump connected to at least one of the plurality of fine channels, configured to supply a liquid to the at least one of the plurality of fine channels; and
    a controller configured to control the driver to enable the pair of grippers to grip the object or controlling the pump to adjust an amount of the liquid supplied to the gripping surface,
    wherein
    the at least one of the plurality of fine channels has a first end connected to the gripping surface and a second end opposite to the one first end,
    the pump is configured to supply the liquid to the at least one of the plurality of fine channels via a connection channel connected to the second end of the at least one of the plurality of fine channels, and
    in the at least one of the plurality of fine channels, a cross-sectional area at the first end thereof is greater than a cross-sectional area at the second end thereof.

15. The device according to claim 14, wherein in the at least one of the plurality of fine channels, a cross-sectional area of the at least one of the plurality of fine channels gradually increases from the first end thereof to the second end thereof.

16. The device according to claim 15, wherein a cross-sectional area of the second end is substantially uniform in a direction in which the liquid is discharged along the plurality of fine channels.

17. The device according to claim 14, wherein the plurality of fine channels are spaced apart from one another by a substantially uniform distance.

* * * * *